UNITED STATES PATENT OFFICE.

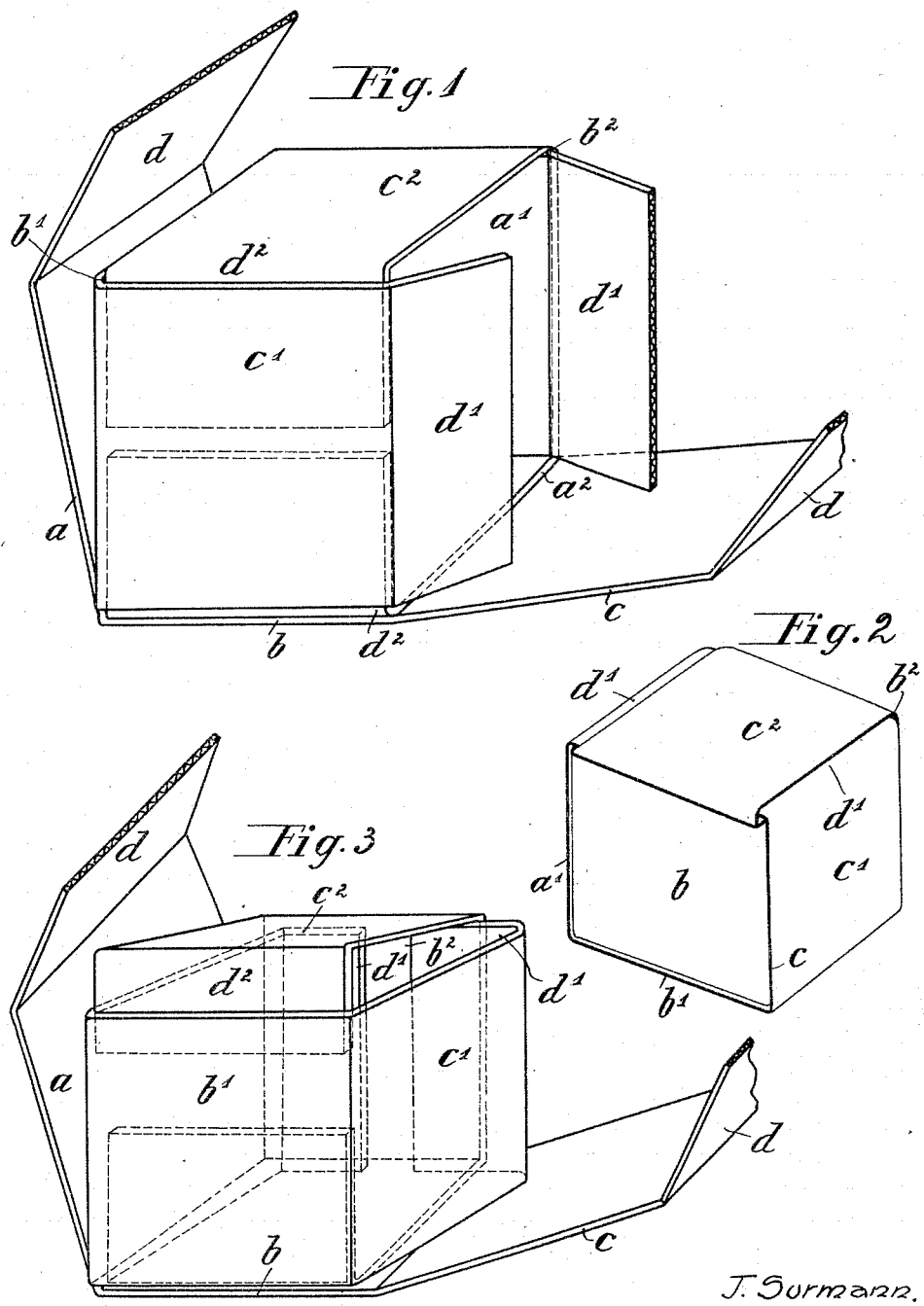

JOHANNES SURMANN, OF BREMEN, GERMANY.

KNOCKDOWN BOX.

1,099,104. Specification of Letters Patent. Patented June 2, 1914.

Original application filed September 27, 1912, Serial No. 722,604. Divided and this application filed January 22, 1913. Serial No. 743,434.

*To all whom it may concern:*

Be it known that I, JOHANNES SURMANN, a subject of the German Emperor, residing at Holzhafen, Bremen, Germany, have invented certain new and useful Improvements in Knockdown Boxes, of which the following is a specification.

This invention relates to knock-down boxes of the type wherein strips of suitable material, for instance, corrugated cardboard, are arranged crosswise and are bent up to form the box.

The invention of the present application, which is a division of my application Serial No. 722,604, has for object to provide an improved box of the above type, wherein no fastening means, such as rivets, slits or flaps are necessary, the box being held together solely by friction.

According to the present invention three strips are used, the meeting edges of each of which are always covered by undivided panels of another strip in three abutting planes of the erected box so that all the edges of the latter are closed.

Figure 1 is a perspective view of a partly erected box according to the present invention; Fig. 2 is a perspective view of this box in its completely erected state; Fig. 3 is a perspective view of a partly erected three-strip box obtained by folding in a modified manner the strips of the box shown in Fig. 1.

The improved box is composed of three full-sized intermediate panels $a$, $b$, $c$; $a'$, $b'$, $c'$; $a^2$, $b^2$, $c^2$; and two-half-sized end panels $d$, $d$; $d'$, $d'$; $d^2$, $d^2$.

As shown in Fig. 1 the strip $d'$, $c'$, $b'$, $a'$, $d'$, is bent into the form of a rectangular frame which is inclosed by the strip $d^2$ $b^2$ $c^2$ $a^2$ $d^2$, in such a manner that the two panels $a'$ and $b^2$ lie one inside the other, and the open sides of the space inclosed by the strip $d'$ $c'$ $b'$ $a'$ are covered by the panels $c^2$ and $a^2$ of the strip $d^2$ $c^2$ $b^2$ $a^2$ $d^2$. The panel $b^2$ lies outside the strip $d'$ $a'$ $b'$ $c'$ $d'$, and the half panels $d^2$ $d^2$ which are turned inward so as to abut with their free edges are situated underneath the panel $c'$ and inside the space inclosed by the other strip. The box-like shell composed of the two strips is then placed with its panel $a^2$ upon the panel $b$ of the third strip $d$ $a$ $b$ $c$ $d$, which latter is then bent up so that its panels $a$ and $c$ lie against the two opposite sides of the box-like shell. The two half panels $d$ $d$ are then turned in underneath the panel $c^2$; namely on the left hand of Fig. 1 between the edges of the panels $b'$ and $c^2$, and on the right hand between the edges of the panel $c^2$ and the abutting half panels $d'$.

In the modification shown in Fig. 3 the butt joint formed by the two half panels $d^2$ $d^2$ is covered by the panel $b'$, and the butt-joint formed by the two half panels $d'$ $d'$, is covered by the panel $b^2$. The strips can be assembled together without the use of fasteners or paste by merely bending the strips along the lines indicated by the scores. Each strip when so bent constitutes one frame for the construction of the box.

Having now described my invention what I claim as new and desire to secure by Letters Patent is:—

1. In a "knock-down" box, the combination of three separate rectangular shells, each composed of a separate bent five-paneled strip, the said shells being so folded that the two end panels of each strip, which come together to form a butt joint, are always covered by a single paneled side of another shell, said shells being held together solely by friction.

2. In a "knock-down" box, the combination of inner, intermediate and outer rectangular shells each composed of a bent five-paneled strip having its two end panels coöperating to form a two-paneled side of the shell, said three shells being folded so that the meeting edges of the ends of the strips are located in three different intersecting planes with the two-paneled side of each shell covered by a single paneled side of one of the other shells, whereby the erected box is closed at all its edges.

In testimony whereof I affix my signature in presence of two witnesses.

JOHANNES SURMANN.

Witnesses:
WILHELM STRUPT,
FREDERICK HOYERINBUM.

---

Copies of this patent may be obtained for five cents each, by addressing the "Commissioner of Patents, Washington, D. C."